United States Patent
Sekiguchi et al.

(10) Patent No.: US 12,151,589 B2
(45) Date of Patent: Nov. 26, 2024

(54) WARMING SYSTEM

(71) Applicant: ISUZU MOTORS LIMITED, Yokohama (JP)

(72) Inventors: Ryo Sekiguchi, Fujisawa (JP); Toshiro Imamura, Fujisawa (JP); Hikaru Ito, Fujisawa (JP)

(73) Assignee: ISUZU MOTORS LIMITED, Yokohama (JP)

( * ) Notice: Subject to any disclaimer, the term of this patent is extended or adjusted under 35 U.S.C. 154(b) by 0 days.

(21) Appl. No.: 18/418,396

(22) Filed: Jan. 22, 2024

(65) Prior Publication Data

US 2024/0253527 A1    Aug. 1, 2024

(30) Foreign Application Priority Data

Jan. 30, 2023   (JP) ................................. 2023-011924

(51) Int. Cl.
*B60L 58/27* (2019.01)
*F01P 3/20* (2006.01)
(Continued)

(52) U.S. Cl.
CPC .................. *B60L 58/27* (2019.02); *F01P 3/20* (2013.01); *F01P 7/14* (2013.01); *H01M 10/613* (2015.04);
(Continued)

(58) Field of Classification Search
CPC ...... B60L 58/27; F01P 3/20; F01P 7/14; F01P 2007/146; F01P 2025/08; F01P 2060/04;
(Continued)

(56) References Cited

U.S. PATENT DOCUMENTS

2016/0318499 A1* 11/2016 Yamanaka .............. B60L 58/27
2017/0028813 A1* 2/2017 Enomoto ........... B60H 1/00899

FOREIGN PATENT DOCUMENTS

CN         105179064 B  *  2/2018
CN         113459764 A  *  10/2021
(Continued)

OTHER PUBLICATIONS

Machine Translation of CN113459764A PDF File Name: "CN113459764A_Machine_Translation.pdf".*

(Continued)

*Primary Examiner* — Grant Moubry
*Assistant Examiner* — Ruben Picon-Feliciano
(74) *Attorney, Agent, or Firm* — Shih IP Law Group, PLLC (57) ABSTRACT

A warming system includes: a first flow path that connects an engine and a first radiator and through which first cooling water circulates; a second flow path that connects a battery and a second radiator and through which second cooling water circulates; a first branch flow path branching downstream of the first radiator and merging upstream of the engine; a first regulating valve routing the first cooling water into the first branch flow path; a second branch flow path branching downstream of the battery and merging upstream of the second radiator; a second regulating valve routing the second cooling water into the second branch flow path; and a first heat exchanger exchanging heat between the first cooling water and the second cooling water.

7 Claims, 4 Drawing Sheets

(51) Int. Cl.
*F01P 7/14* (2006.01)
*H01M 10/613* (2014.01)
*H01M 10/625* (2014.01)
*H01M 10/63* (2014.01)
*H01M 10/6568* (2014.01)
*H01M 10/663* (2014.01)

(52) U.S. Cl.
CPC ......... *H01M 10/625* (2015.04); *H01M 10/63* (2015.04); *H01M 10/6568* (2015.04); *H01M 10/663* (2015.04); *F01P 2007/146* (2013.01); *F01P 2025/08* (2013.01); *F01P 2060/04* (2013.01); *F01P 2060/18* (2013.01); *H01M 2220/20* (2013.01)

(58) Field of Classification Search
CPC ............. F01P 2060/18; H01M 10/613; H01M 10/625; H01M 10/63; H01M 10/6568; H01M 10/663; H01M 2220/20
See application file for complete search history.

(56) References Cited

FOREIGN PATENT DOCUMENTS

| | | | |
|---|---|---|---|
| CN | 113335021 B | * 5/2022 | |
| FR | 2973743 A1 | * 10/2012 | ............. B60K 11/02 |
| JP | 2011-247210 A | 12/2011 | |
| JP | 2015140115 A | * 8/2015 | ......... B60H 1/00278 |

OTHER PUBLICATIONS

Machine Translation of JP2015140115A PDF File Name: "JP2015140115A_Machine_Translation.pdf".*
Machine Translation of FR2973743A1 PDF File Name: "FR2973743A1_Machine_Translation.pdf".*
Machine Translation of CN113335021B PDF File Name: "CN113335021B_Machine_Translation.pdf".*
Machine Translation of CN105179064B PDF File Name: "CN105179064B_Machine_Translation.pdf".*

* cited by examiner

WARMING SYSTEM

CROSS-REFERENCE TO RELATED APPLICATIONS

The present application claims priority to Japanese Patent Application number 2023-011924, filed on Jan. 30, 2023, contents of which are incorporated herein by reference in its entirety.

BACKGROUND OF THE INVENTION

The present disclosure relates to a warming system.

A conventional vehicle uses a heat medium to warm up a power storage device by causing the heat medium, which was introduced from the outside, to exchange heat with an engine at the time of storing power in a battery included in the vehicle (for example, Japanese Unexamined Patent Application Publication No. 2011-247210).

In the conventional vehicle, the engine starts after the battery charging is completed. This can lead to frictional losses in components constituting the engine due to a decrease in the temperature of the engine, resulting in decreased fuel efficiency and an increase in exhaust gas emissions.

BRIEF SUMMARY OF THE INVENTION

The present disclosure has been made in view of these points, and its object is to increase the temperature of an engine during startup.

A warming system according to a first aspect of the present disclosure includes: a first flow path that connects an engine and a first radiator and through which first cooling water circulates between the engine and the first radiator; a second flow path that connects a battery and a second radiator and through which second cooling water circulates between the battery and the second radiator; a first branch flow path provided such that the first branch flow path branches downstream of the first radiator in the first flow path and merges upstream of the engine in the first flow path; a first regulating valve that switches whether or not to route the first cooling water from the first flow path into the first branch flow path; a second branch flow path provided such that the second branch flow path branches downstream of the battery in the second flow path and merges upstream of the second radiator in the second flow path; a second regulating valve that switches whether or not to route the second cooling water from the second flow path into the second branch flow path; a first heat exchanger that exchanges heat between the first cooling water flowing through the first branch flow path and the second cooling water flowing through the second branch flow path; and a control part that controls the first regulating valve and the second regulating valve.

A warming system according to a second aspect of the present disclosure includes: a first flow path through which first cooling water circulates between an engine and a first radiator; a second flow path through which second cooling water circulates between a battery and a second radiator; a heat exchange part that exchanges heat between the first cooling water and the second cooling water; and a control part that controls the heat exchange part, wherein the control part controls the heat exchange part to transmit heat generated by the battery to the first cooling water via the heat exchange part if the battery is being charged.

DETAILED DESCRIPTION OF THE INVENTION

Hereinafter, the present disclosure will be described through exemplary embodiments, but the following exemplary embodiments do not limit the invention according to the claims, and not all of the combinations of features described in the exemplary embodiments are necessarily essential to the solution means of the invention.

<Configuration of the Warming System S>

Figure 1:
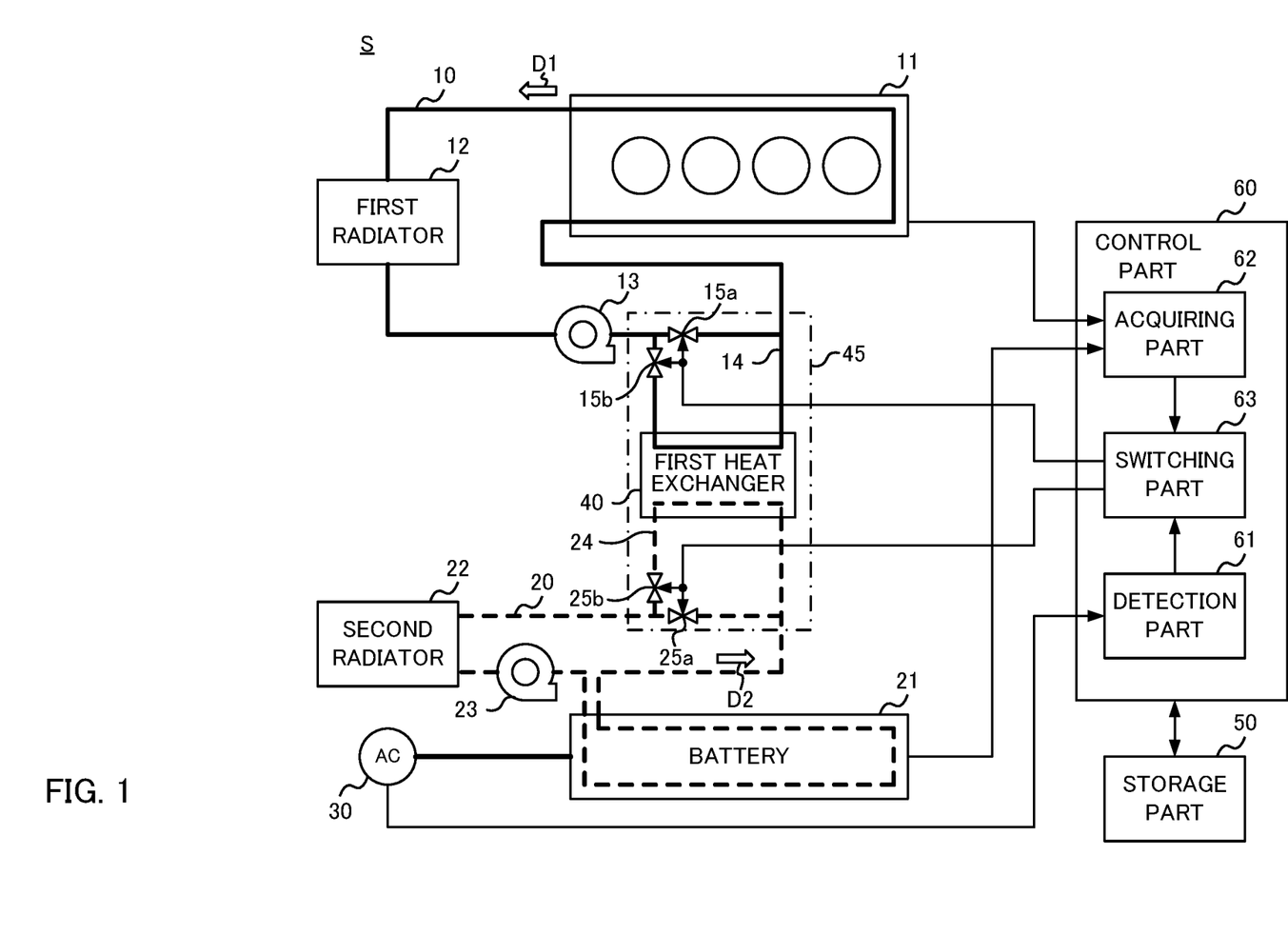
FIG. 1 is a diagram schematically showing a configuration of a warming system S according to the present embodiment.

FIG. 1 is a diagram schematically showing a configuration of a warming system S according to the present embodiment. The warming system S shown in FIG. 1 includes a first flow path 10, an engine 11, a first radiator 12, a first pump 13, a first branch flow path 14, a first regulating valve 15a, a first regulating valve 15b, a second flow path 20, a battery 21, a second radiator 22, a second pump 23, a second branch flow path 24, a second regulating valve 25a, a second regulating valve 25b, a charging port 30, a first heat exchanger 40, a storage part 50, and a control part 60.

The warming system S is mounted in a vehicle such as a Plug-in Hybrid Electric Vehicle (PHEV), and has a function of warming up the engine 11 using heat generated by the battery 21 when the battery 21 is charged.

The first flow path 10 is a flow path that connects the engine 11 and the first radiator 12 and through which first cooling water circulates between the engine 11 and the first radiator 12. The engine 11, the first radiator 12, the first pump 13, and the first regulating valve 15a are provided to the first flow path 10 along a direction of circulation D1 of the first cooling water.

The engine 11 is a power source for causing a vehicle equipped with the warming system S to travel. The first radiator 12 is provided downstream of the engine 11 in the direction of circulation D1 of the first cooling water, and cools the first cooling water that has passed through the engine 11. The first radiator 12 cools the first cooling water by exchanging heat between the first cooling water and wind (traveling wind) blowing from the front of the vehicle, for example. The first radiator 12 may be provided with a fan to promote the inflow of wind from the front of the vehicle.

The first pump 13 is provided downstream of the first radiator 12 and upstream of the engine 11 in the direction of circulation D1 of the first cooling water, and circulates the first cooling water through the first flow path 10. It should be noted that the first pump 13 need only be provided at a location enabling the first pump 13 to circulate the first cooling water of the first flow path 10, and may be provided downstream of the engine 11 and upstream of the first radiator 12 in the direction of circulation D1 of the first cooling water, for example.

The first branch flow path 14 is a flow path provided such that it branches downstream of the first radiator 12 in the first flow path 10 and merges upstream of the engine 11 in the first flow path 10. A part of a pipe forming the first branch flow path 14 passes through the first heat exchanger 40.

The first regulating valve 15a (a primary first regulating valve 15a) and the first regulating valve 15b (a secondary first regulating valve 15b) are regulating valves for switching whether or not to route the first cooling water from the first flow path 10 into the first branch flow path 14. The first regulating valve 15a is provided between a branch point of the first branch flow path 14 and a junction point of the first branch flow path 14 within the first flow path 10, and the first regulating valve 15b is provided in the first branch flow path 14.

The second flow path 20 is a flow path that connects the battery 21 and the second radiator 22 and through which the second cooling water circulates between the battery 21 and the second radiator 22. The battery 21, the second regulating valve 25a, the second radiator 22, and the second pump 23 are provided to the second flow path 20 along a direction of circulation D2 of the second cooling water.

The battery 21 is a power storage device for supplying electric power to a motor, which is a power source for causing the vehicle equipped with the warming system S to travel. The second radiator 22 is provided downstream of the battery 21 in the direction of circulation D2 of the second cooling water, and cools the second cooling water that has passed through the battery 21. The second radiator 22 cools the second cooling water by exchanging heat between the second cooling water and wind (traveling wind) blowing from the front of the vehicle, for example. The second radiator 22 may be provided with a fan to promote the inflow of wind from the front of the vehicle.

The second pump 23 is provided downstream of the second radiator 22 and upstream of the battery 21 in the direction of circulation D2 of the second cooling water, and circulates the second cooling water through the second flow path 20. It should be noted that the second pump 23 need only be provided at a location enabling the second pump 23 to circulate the second cooling water of the second flow path 20, and may be provided downstream of the battery 21 and upstream of the second radiator 22 in the direction of circulation D2 of the second cooling water, for example.

The second branch flow path 24 is a flow path provided such that it branches downstream of the battery 21 in the second flow path 20 and merges upstream of the second radiator 22 in the second flow path 20. A part of a pipe forming the second branch flow path 24 passes through the first heat exchanger 40.

The second regulating valve 25a (a primary second regulating valve 25a) and the second regulating valve 25b (a secondary second regulating valve 25b) are regulating valves for switching whether or not to route the second cooling water from the second flow path 20 into the second branch flow path 24. The second regulating valve 25a is provided between a branch point of the second branch flow path 24 and a junction point of the second branch flow path 24 within the second flow path 20, and the second regulating valve 25b is provided in the second branch flow path 24.

The charging port 30 is a socket for supplying electric power to the battery 21 from the outside of the vehicle equipped with the warming system S. As an example, a user of the vehicle stops the vehicle at a location where a power supply device is installed (which is a so-called charging station) and connects the tip of a power supply cable included in the power supply device to the charging port 30, thereby charging the battery 21 with power that is output from the power supply device.

The first heat exchanger 40 is provided such that the first branch flow path 14 and the second branch flow path 24 pass through its inside, and exchanges heat between the first cooling water flowing through the first branch flow path 14 and the second cooling water flowing through the second branch flow path 24. For example, the first heat exchanger 40 provides heat from the second cooling water, which has experienced heat exchange with the battery 21, to the first cooling water and warms the first cooling water.

Here, it can be said that the first branch flow path 14, the second branch flow path 24, the first regulating valve 15a, the first regulating valve 15b, the second regulating valve 25a, and the second regulating valve 25b are a heat exchange part 45 that exchanges heat between the first cooling water and the second cooling water.

The storage part 50 includes a storage medium such as a Read Only Memory (ROM), a Random Access Memory (RAM), a Hard Disk Drive (HDD), or a Solid State Drive (SSD). The storage part 50 stores a program executed by the control part 60. The storage part 50 stores various types of information for warming up the engine 11 using heat generated by the battery 21.

The control part 60 is a processor such as a Central Processing Unit (CPU) or an Electronic Control Unit (ECU), for example. The control part 60 controls the heat exchange part 45 to control heat exchange between the first cooling water flowing through the first flow path 10 and the second cooling water flowing through the second flow path 20. If the battery 21 is being charged, the control part 60 controls the heat exchange part 45 to transmit heat generated by the battery 21 to the first cooling water via the heat exchange part 45. This allows heat generated by the battery 21 during charging to warm the engine 11, so that the temperature of the engine 11, which starts after charging, can be increased before starting the engine 11 (that is, during charging of the battery 21).

The control part 60 functions as a detection part 61, an acquiring part 62, and a switching part 63 by executing a program stored in the storage part 50. It should be noted that the control part 60 may be configured by a single processor, or may be configured by a plurality of processors or a combination of one or more processors and an electronic circuit.

A configuration of each part implemented by the control part 60 will be described below.

The detection part 61 detects the power supply state to the battery 21. The detection part 61 detects that the tip of the power supply cable has not been connected to the charging port 30, thereby detecting that electric power is not being supplied to the battery 21 from outside the vehicle. The detection part 61 detects that the tip of the power supply cable has been connected to the charging port 30, thereby detecting that electric power will be supplied to the battery 21 from the outside of the vehicle at a timing after the timing when this cable was connected. Further, the detection part 61 may detect that electric power is being supplied to the battery 21 from outside the vehicle by detecting that a current is flowing between the charging port 30 and the battery 21. The detection part 61 may detect that electric power is not being supplied to the battery 21 from outside the vehicle by detecting that no current is flowing between the charging port 30 and the battery 21.

The acquiring part 62 acquires the temperature of the first cooling water and the temperature of the second cooling water. The acquiring part 62 acquires the temperature of the first cooling water detected by a temperature sensor provided in the first flow path 10, for example. The acquiring part 62 acquires the temperature of the second cooling water detected by a temperature sensor provided in the second flow path 20, for example.

The switching part 63 controls the first regulating valve 15a and the first regulating valve 15b, thereby controlling whether or not to route the first cooling water in the first flow path 10 into the first branch flow path 14. The switching part 63 controls the second regulating valve 25a and the second regulating valve 25b, thereby controlling whether or not to route the second cooling water in the second flow path 20 into the second branch flow path 24.

If the detection part 61 has detected that electric power will be supplied to the battery 21, the switching part 63 switches the first regulating valve 15a and the first regulating valve 15b so as to route the first cooling water into the first branch flow path 14. Then, the switching part 63 switches the second regulating valve 25a and the second regulating valve 25b so as to route the second cooling water into the second branch flow path 24.

Specifically, if the detection part 61 has detected that electric power will be supplied to the battery 21, the switching part 63 closes the first regulating valve 15a, opens the first regulating valve 15b, closes the second regulating valve 25a, and opens the second regulating valve 25b. The switching part 63 operating in this manner causes heat exchange between the first cooling water in the first flow path 10 and the second cooling water in the second flow path 20 within the first heat exchanger 40. As a result, the first cooling water that has exchanged heat with the second cooling water, which was provided with heat generated by charging the battery 21, provides heat to the engine 11 (i.e., the engine 11 is warmed up). Therefore, this makes it possible to increase the temperature of the engine 11 during startup and prevent frictional losses in components constituting the engine 11.

If the state where the detection part 61 has detected that electric power will be supplied to the battery 21 has changed to the state where the detection part 61 has detected that electric power is not being supplied to the battery 21, the switching part 63 switches the first regulating valve 15a and the first regulating valve 15b so as not to route the first cooling water into the first branch flow path 14. Further, the switching part 63 switches the second regulating valve 25a and the second regulating valve 25b so as not to route the second cooling water into the second branch flow path 24.

Specifically, if the state where the detection part 61 has detected that electric power will be supplied to the battery 21 has changed to the state where the detection part 61 has detected that electric power is not being supplied to the battery 21, the switching part 63 opens the first regulating valve 15a, closes the first regulating valve 15b, opens the second regulating valve 25a, and closes the second regulating valve 25b. As a result, the first cooling water does not flow into the first branch flow path 14, and the second cooling water does not flow into the second branch flow path 24. The switching part 63 operating in this manner allows the first cooling water to cool the engine 11 and the second cooling water to cool the battery 21 if the battery 21 is not being charged.

The switching part 63 may switch whether or not to route the first cooling water into the first branch flow path 14 and whether or not to route the second cooling water into the second branch flow path 24 on the basis of the temperature of the first cooling water and the temperature of the second cooling water acquired by the acquiring part 62.

Specifically, if the temperature of the first cooling water is lower than a first threshold and the temperature of the second cooling water is equal to or higher than a second threshold that is greater than the first threshold, the switching part 63 switches the first regulating valve 15a and the first regulating valve 15b so as to route the first cooling water into the first branch flow path 14. Further, the switching part 63 switches the second regulating valve 25a and the second regulating valve 25b so as to route the second cooling water into the second branch flow path 24. The first threshold is an upper limit value of a temperature at which frictional losses in components constituting the engine 11 occur when the engine 11 has operated, and is stored in the storage part 50. The second threshold is a lower limit value of a temperature at which the second cooling water can provide heat to the first cooling water, and is stored in the storage part 50. The switching part 63 operating in this manner can prevent the first cooling water from providing heat to the second cooling water.

Further, if the temperature of the first cooling water has reached the temperature of the second cooling water, the switching part 63 switches the first regulating valve 15a and the first regulating valve 15b so as not to route the first cooling water into the first branch flow path 14, for example. Further, the switching part 63 switches the second regulating valve 25a and the second regulating valve 25b so as not to route the second cooling water into the second branch flow path 24. Since the switching part 63 operating in this manner can stop heat exchange between the second cooling water and the first cooling water in a case where the second cooling water cannot provide heat to the first cooling water, fuel consumption or electric power consumption can be reduced.

<Processing Sequence in the Warming System S>

Figure 2:
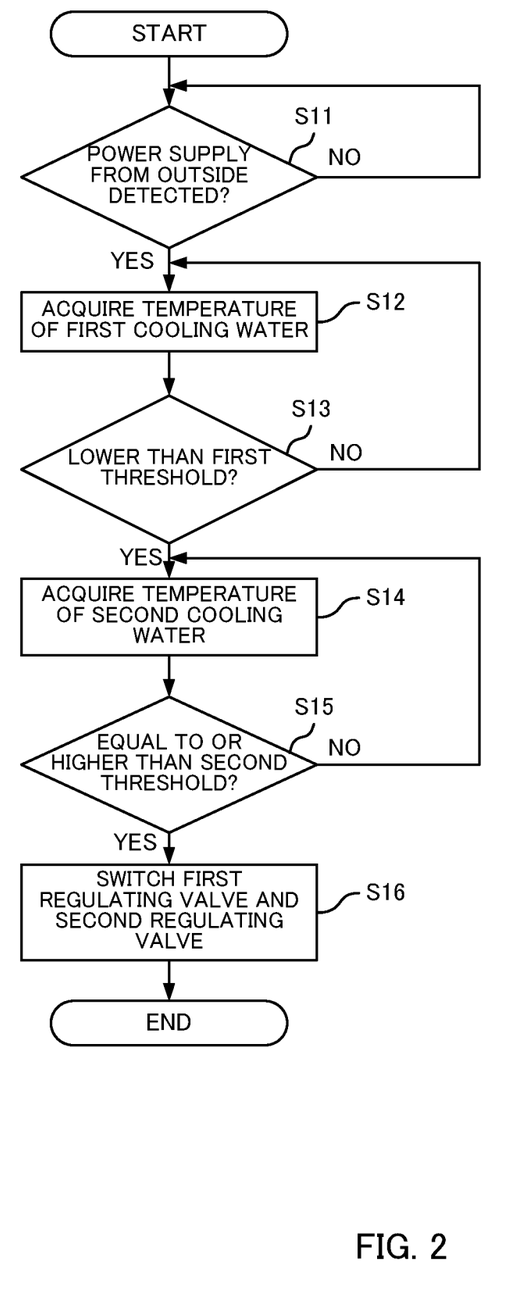
FIG. 2 is a diagram showing an example of a processing sequence in the warming system S.

FIG. 2 is a diagram showing an example of a processing sequence in the warming system S. The processing sequence shown in FIG. 2 shows an operation of the switching part 63 to switch the first regulating valve 15a, the first regulating valve 15b, the second regulating valve 25a, and the second regulating valve 25b on the basis of the temperature of the first cooling water and the temperature of the second cooling water detected by the detection part 61.

First, the detection part 61 detects that electric power will be supplied to the battery 21 from the outside of the vehicle equipped with the warming system S by detecting that the tip of the charging cable has been connected to the charging port 30 (S11). If the detection part 61 has not detected that electric power will be supplied to the battery 21 ("NO" in S11), the detection part 61 repeats the processing of S11. If the detection part 61 has detected that electric power will be supplied to the battery 21 ("YES" in S11), the acquiring part 62 acquires the temperature of the first cooling water detected by the temperature sensor provided in the first flow path 10 passing through the engine 11 (S12).

If the temperature of the first cooling water is equal to or higher than the first threshold ("NO" in S13), the acquiring part 62 repeats the operation of S12. If the temperature of the first cooling water is lower than the first threshold ("YES" in S13), the acquiring part 62 acquires the temperature of the second cooling water detected by the temperature sensor provided in the second flow path 20 passing through the battery 21 (S14).

If the temperature of the second cooling water is lower than the second threshold ("NO" in S15), the acquiring part 62 repeats the operation of S14. If the temperature of the second cooling water is equal to or higher than the second threshold ("YES" in S15), the switching part 63 switches the first regulating valve 15a, the first regulating valve 15b, the second regulating valve 25a, and the second regulating valve 25b (S16). Specifically, the switching part 63 closes the first regulating valve 15a, opens the first regulating valve 15b, closes the second regulating valve 25a, and opens the second regulating valve 25b. As a result, the first cooling water flows into the first branch flow path 14, and the second cooling water flows into the second branch flow path 24, and therefore the first heat exchanger 40 exchanges heat between the first cooling water and the second cooling water.

First Variation Example

In the above description, an operation in which the first cooling water in the first flow path 10 passes through the first radiator 12 has been described, but the present embodiment is not limited to this. In the case of exchanging heat between the first cooling water and the second cooling water via the first heat exchanger 40, the switching part 63 may route the first cooling water into a bypass flow path for bypassing the first radiator 12.

Figure 3:
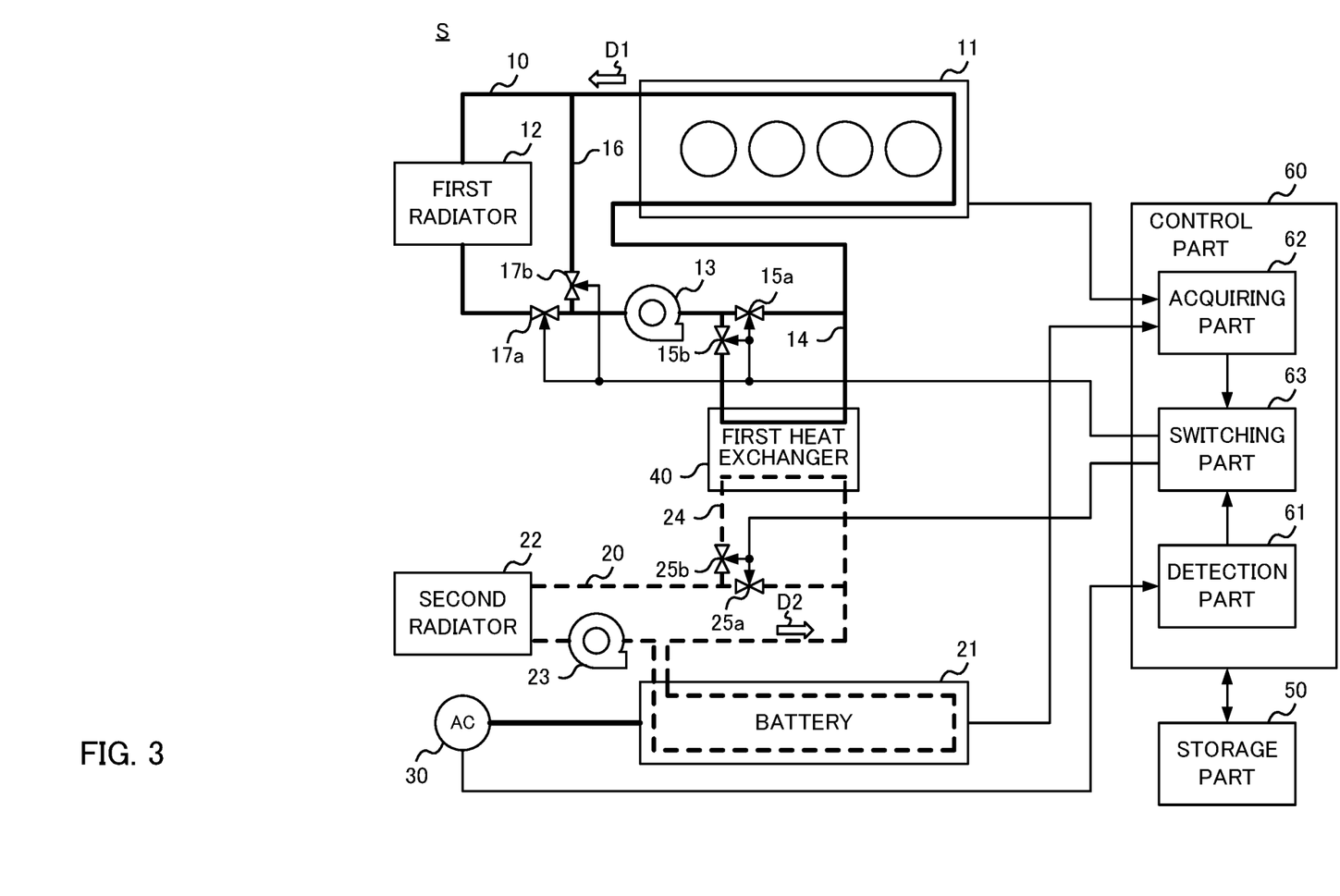
FIG. 3 is a diagram schematically showing a configuration of a warming system S according to a first variation example.

FIG. 3 is a diagram schematically showing a configuration of a warming system S according to a first variation example. The warming system S shown in FIG. 3 differs from the warming system S shown in FIG. 1 in that it includes a bypass flow path 16, a bypass regulating valve 17a, and a bypass regulating valve 17b, and is the same as the warming system S shown in FIG. 1 in all other ways.

The bypass flow path 16 is provided such that it branches upstream of the first radiator 12 in the first flow path 10 and merges downstream of the first radiator 12 in the first flow path 10. The bypass regulating valve 17a and the bypass regulating valve 17b are regulating valves for switching whether or not to route the first cooling water from the first flow path 10 into the bypass flow path 16. The bypass regulating valve 17a is provided between the first radiator 12 and a junction point of the bypass flow path 16 in the first flow path 10, and the bypass regulating valve 17b is provided in the bypass flow path 16. It should be noted that the bypass regulating valve 17a may be provided such that it routes the first cooling water in the first flow path 10 into the bypass flow path 16, and may be provided between the first radiator 12 and a branch point of the bypass flow path 16 in the first flow path 10.

In FIG. 3, if the detection part 61 has detected that electric power will be supplied to the battery 21, the switching part 63 switches the bypass regulating valve 17a and the bypass regulating valve 17b so as to route the first cooling water into the bypass flow path 16. Specifically, if the detection part 61 has detected that the tip of the charging cable has been connected to the charging port 30, the switching part 63 closes the bypass regulating valve 17a and opens the bypass regulating valve 17b. The switching part 63 operating in this manner prevents the first radiator 12 from cooling the first cooling water, which has been provided with heat by the second cooling water, making it is easier for the first cooling water to warm up the engine 11.

If the state where the detection part 61 has detected that electric power will be supplied to the battery 21 has changed to the state where the detection part 61 has detected that electric power is not being supplied to the battery 21, the switching part 63 switches the bypass regulating valve 17a and the bypass regulating valve 17b so as not to route the first cooling water into the bypass flow path. Specifically, if the state where the detection part 61 has detected that electric power will be supplied to the battery 21 has changed to the state where the detection part 61 has detected that electric power is not being supplied to the battery 21, the switching part 63 opens the bypass regulating valve 17a and closes the bypass regulating valve 17b. The switching part 63 operating in this manner allows the first radiator 12 to cool the first cooling water after the end of charging of the battery 21. As a result, the user of the vehicle can start the vehicle without delay after the end of charging of the battery 21.

Second Variation Example

In the above description, an operation in which the first cooling water in the first flow path 10 and the second cooling water in the second flow path 20 exchange heat with each other via the first heat exchanger 40 has been described, but the present embodiment is not limited to this. The second cooling water in the second flow path 20 may exchange heat with engine oil of the engine 11 in addition to the first cooling water in the first flow path 10.

Figure 4:
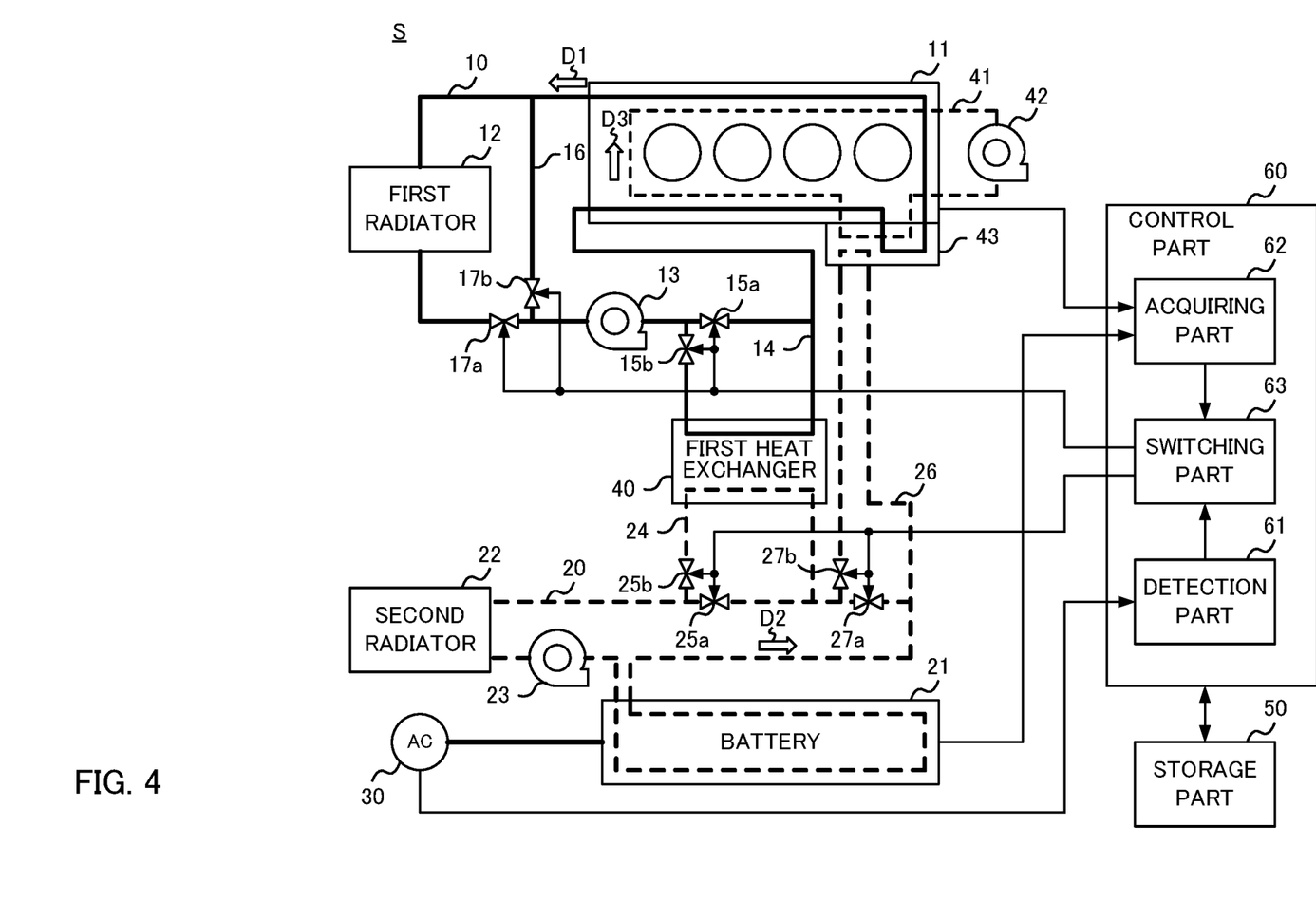
FIG. 4 is a diagram schematically showing a configuration of a warming system S according to a second variation example.

FIG. 4 is a diagram schematically showing a configuration of a warming system S according to a second variation example. The warming system S shown in FIG. 4 differs from the warming system S shown in FIG. 3 in that it includes a third branch flow path 26, a third regulating valve 27a, a third regulating valve 27b, an oil flow path 41, an oil pump 42, and an oil cooler 43, and is the same as the warming system S shown in FIG. 3 in all other ways.

The third branch flow path 26 is provided such that it branches downstream of the battery 21 in the second flow path 20, passes through the oil cooler 43, and merges upstream of the second radiator 22 in the second flow path 20. The third regulating valve 27a and the third regulating valve 27b are regulating valves for switching whether or not to route the second cooling water from the second flow path 20 into the third branch flow path 26. The third regulating valve 27a is provided between a branch point and a junction point of the third branch flow path 26 in the second flow path 20, and the third regulating valve 27b is provided in the third branch flow path 26.

The oil flow path 41 is a flow path that connects the engine 11 and the oil cooler 43 and through which the engine oil circulates between the engine 11 and the oil cooler 43. The engine 11, the oil pump 42, and the oil cooler 43 are provided to the oil flow path 41 along a direction of circulation D3 of the engine oil.

The oil pump 42 is provided downstream of the engine 11 and upstream of the oil cooler 43 in the direction of circulation D3 of the engine oil, and circulates the engine oil through the oil flow path 41. It should be noted that the oil pump 42 may be provided at a location enabling the oil pump 42 to circulate the engine oil in the oil flow path 41, and may be provided downstream of the oil cooler 43 and upstream of the engine 11 in the direction of circulation D3 of the engine oil, for example.

The oil cooler 43 cools the engine oil by exchanging heat between the engine oil and wind (traveling wind) blowing from the front of the vehicle, for example. The oil cooler 43 may be provided with a fan to promote the inflow of wind from the front of the vehicle. The oil cooler 43 is provided with a second heat exchanger (not shown) that exchanges heat between the engine oil flowing through the oil flow path 41 and the second cooling water flowing through the third branch flow path 26. The second heat exchanger is provided such that the third branch flow path 26 and the oil flow path 41 pass through its inside, and exchanges heat between the second cooling water flowing through the third branch flow path and the engine oil flowing through the oil flow path 41, for example. The second heat exchanger provides heat from the second cooling water, which has exchanged heat with the battery 21, to the engine oil to warm the engine oil, for example.

In FIG. 4, the acquiring part 62 acquires the temperature of the engine oil detected by a temperature sensor provided in the oil flow path 41 passing through the engine 11. If the detection part 61 has detected that electric power will be supplied to the battery 21, and the temperature of the engine oil has not reached a predetermined temperature, the switching part 63 switches the second regulating valve 25*a* and the second regulating valve 25*b* so as not to route the second cooling water into the second branch flow path 24. Further, the switching part 63 switches the third regulating valve 27*a* and the third regulating valve 27*b* so as to route the second cooling water into the third branch flow path 26. The predetermined temperature is a temperature at which frictional losses in components constituting the engine 11 do not occur during the operation of the engine 11, and is stored in the storage part 50.

Specifically, the switching part 63 identifies that the detection part 61 has detected that electric power will be supplied to the battery 21 and that the temperature of the engine oil acquired by the acquiring part 62 is lower than the predetermined temperature. Subsequently, the switching part 63 opens the second regulating valve 25*a*, closes the second regulating valve 25*b*, closes the third regulating valve 27*a*, and opens the third regulating valve 27*b*. As a result, the second cooling water does not flow into the second branch flow path 24, and the second cooling water flows into the third branch flow path 26. The switching part 63 operating in this manner enables heat exchange between the second cooling water in the third branch flow path 26 and the engine oil in the oil flow path 41 via the second heat exchanger.

If the detection part 61 has detected that electric power will be supplied to the battery 21, and the temperature of the engine oil has reached the predetermined temperature, the switching part 63 switches the second regulating valve 25*a* and the second regulating valve 25*b* so as to route the second cooling water into the second branch flow path 24. Further, the switching part 63 switches the third regulating valve 27*a* and the third regulating valve 27*b* so as not to route the second cooling water into the third branch flow path 26.

Specifically, the switching part 63 identifies that the detection part 61 has detected that electric power will be supplied to the battery 21 and that the temperature of the engine oil acquired by the acquiring part 62 has reached the predetermined temperature. Subsequently, the switching part 63 closes the second regulating valve 25*a*, opens the second regulating valve 25*b*, opens the third regulating valve 27*a*, and closes the third regulating valve 27*b*. As a result, the second cooling water flows into the second branch flow path 24, and the second cooling water does not flow into the third branch flow path 26. The switching part 63 operating in this manner enables heat exchange between the first cooling water in the first flow path 10 and the second cooling water in the second flow path 20 via the first heat exchanger 40, after the temperature of the engine oil in the oil flow path 41 has reached the predetermined temperature. As a result, heat can be provided to the engine oil and the first cooling water, and therefore the engine 11 can be warmed up easily.

Third Variation Example

The above describes an operation using two two-way valves in each of the first regulating valve 15*a* and the first regulating valve 15*b*; the second regulating valve 25*a* and the second regulating valve 25*b*; the bypass regulating valve 17*a* and the bypass regulating valve 17*b*; and the third regulating valve 27*a* and the third regulating valve 27*b*, but the present embodiment is not limited to this. Each first regulating valve 15, each second regulating valve 25, each bypass regulating valve 17, and each third regulating valve 27 may be a single three-way valve.

<Effects of the Warming System S>

As described above, the warming system S includes: the first flow path 10 through which the first cooling water circulates between the engine 11 and the first radiator 12; the second flow path 20 through which the second cooling water circulates between the battery 21 and the second radiator 22; the first branch flow path 14 provided such that it branches downstream of the first radiator 12 in the first flow path 10 and merges upstream of the engine 11 in the first flow path 10; the first regulating valve 15*a* and the first regulating valve 15*b* for switching whether or not to route the first cooling water from the first flow path 10 into the first branch flow path 14; the second branch flow path 24 provided such that it branches downstream of the battery 21 in the second flow path 20 and merges upstream of the second radiator 22 in the second flow path 20; the second regulating valve 25*a* and the second regulating valve 25*b* for switching whether or not to route the second cooling water from the second flow path 20 into the second branch flow path 24; and the first heat exchanger 40 that exchanges heat between the first cooling water and the second cooling water.

Further, if the detection part 61 has detected that electric power will be supplied to the battery 21 from the outside of the vehicle, the switching part 63 switches the first regulating valve 15*a* and the first regulating valve 15*b* so as to route the first cooling water into the first branch flow path 14, and switches the second regulating valve 25*a* and the second regulating valve 25*b* so as to route the second cooling water into the second branch flow path 24.

The warming system S configured in this manner enables heat exchange between (i) the second cooling water provided with heat generated by the battery 21 by charging the battery 21 and (ii) the first cooling water in the first flow path 10. As a result, the first cooling water provided with heat by the second cooling water can warm up the engine 11, and therefore the temperature of the engine 11 during startup can be increased, making it possible to prevent frictional losses in components constituting the engine 11 due to a decrease in the temperature of the engine 11.

What is claimed is:

1. A warming system comprising:
   a first flow path that connects an engine and a first radiator and through which first cooling water circulates between the engine and the first radiator;
   a second flow path that connects a battery and a second radiator and through which second cooling water circulates between the battery and the second radiator;
   a first branch flow path provided such that the first branch flow path branches downstream of the first radiator in the first flow path and merges upstream of the engine in the first flow path;
   a first regulating valve that switches whether or not to route the first cooling water from the first flow path into the first branch flow path;
   a second branch flow path provided such that the second branch flow path branches downstream of the battery in the second flow path and merges upstream of the second radiator in the second flow path;

a second regulating valve that switches whether or not to route the second cooling water from the second flow path into the second branch flow path;
a first heat exchanger that exchanges heat between the first cooling water flowing through the first branch flow path and the second cooling water flowing through the second branch flow path; and
a control part that controls the first regulating valve and the second regulating valve, the control part including a switching part that switches opening and closing of the first regulating valve and the second regulating valve,
wherein
if it has been detected that electric power will be supplied to the battery from outside of a vehicle including the battery, the switching part switches the first regulating valve so as to route the first cooling water into the first branch flow path, and switches the second regulating valve so as to route the second cooling water into the second branch flow path, and
if a state where it has been detected that the electric power will be supplied has changed to a state where it has been detected that the electric power is not being supplied, the switching part switches the first regulating valve so as not to route the first cooling water into the first branch flow path, and switches the second regulating valve so as not to route the second cooling water into the second branch flow path.

2. The warming system according to claim 1, further comprising:
an acquiring part that acquires a temperature of the first cooling water and a temperature of the second cooling water,
wherein if the temperature of the first cooling water is lower than a first threshold and the temperature of the second cooling water is equal to or higher than a second threshold that is greater than the first threshold, the switching part switches the first regulating valve so as to route the first cooling water into the first branch flow path, and switches the second regulating valve so as to route the second cooling water into the second branch flow path.

3. The warming system according to claim 2, wherein if the temperature of the first cooling water has reached the temperature of the second cooling water, the switching part switches the first regulating valve so as not to route the first cooling water into the first branch flow path, and switches the second regulating valve so as not to route the second cooling water into the second branch flow path.

4. The warming system according to claim 1, further comprising:
a bypass flow path provided such that the bypass flow path branches upstream of the first radiator in the first flow path and merges downstream of the first radiator in the first flow path; and
a bypass regulating valve that switches whether or not to route the first cooling water from the first flow path into the bypass flow path,
wherein the switching part switches the bypass regulating valve so as to route the first cooling water into the bypass flow path if the electric power will be supplied.

5. The warming system according to claim 4, wherein the switching part switches the bypass regulating valve so as not to route the first cooling water into the bypass flow path if the state where it has been detected that the electric power will be supplied has changed to the state where it has been detected that the electric power is not being supplied.

6. The warming system according to claim 1, further comprising:
an oil flow path that connects the engine and an oil cooler and through which engine oil circulates between the engine and the oil cooler;
a third branch flow path provided such that the third branch flow path branches downstream of the battery in the second flow path, passes through the oil cooler, and merges upstream of the second radiator in the second flow path;
a third regulating valve that switches whether or not to route the second cooling water from the second flow path into the third branch flow path;
a second heat exchanger that is provided in the oil cooler and exchanges heat between the engine oil flowing through the oil flow path and the second cooling water flowing through the third branch flow path; and
an acquiring part that acquires a temperature of the engine oil,
wherein
if it has been detected that the electric power will be supplied and the temperature of the engine oil has not reached a predetermined temperature, the switching part switches the second regulating valve so as not to route the second cooling water into the second branch flow path, and switches the third regulating valve so as to route the second cooling water into the third branch flow path, and
if it has been detected that the electric power will be supplied and the temperature of the engine oil has reached the predetermined temperature, the switching part switches the second regulating valve so as to route the second cooling water into the second branch flow path, and switches the third regulating valve so as not to route the second cooling water into the third branch flow path.

7. A warming system comprising:
a first flow path that connects an engine and a first radiator and through which first cooling water circulates between the engine and the first radiator;
a second flow path that connects a battery and a second radiator and through which second cooling water circulates between the battery and the second radiator;
a first branch flow path provided such that the first branch flow path branches downstream of the first radiator in the first flow path and merges upstream of the engine in the first flow path;
a first regulating valve that switches whether or not to route the first cooling water from the first flow path into the first branch flow path;
a second branch flow path provided such that the second branch flow path branches downstream of the battery in the second flow path and merges upstream of the second radiator in the second flow path;
a second regulating valve that switches whether or not to route the second cooling water from the second flow path into the second branch flow path;
a first heat exchanger that exchanges heat between the first cooling water flowing through the first branch flow path and the second cooling water flowing through the second branch flow path;
a control part that controls the first regulating valve and the second regulating valve;

a primary first regulating valve and a secondary first regulating valve serving as the first regulating valve; and a primary second regulating valve and a secondary second regulating valve serving as the second regulating valve, wherein the primary first regulating valve is provided between a branch point of the first branch flow path and a junction point of the first branch flow path within the first flow path, the secondary first regulating valve is provided in the first branch flow path, the primary second regulating valve is provided between a branch point of the second branch flow path and a junction point of the second branch flow path within the second flow path, and the secondary second regulating valve is provided in the second branch flow path.

\* \* \* \* \*